United States Patent
Siegel

[15] 3,673,443
[45] June 27, 1972

[54] PRESSURE TRANSDUCER WITH REDUCED TEMPERATURE SENSITIVITY

[72] Inventor: Vernon H. Siegel, Clarence, N.Y.

[73] Assignee: Sundstrand Data Control Incorporated, Redmond, Wash.

[22] Filed: Dec. 31, 1970

[21] Appl. No.: 103,330

Related U.S. Application Data

[63] Continuation of Ser. No. 22,132, April 1, 1970, abandoned, which is a continuation of Ser. No. 703,621, Feb. 7, 1968, abandoned.

[52] U.S. Cl. .................................. 310/8.7, 310/8.9, 310/9.1
[51] Int. Cl. ........................................................ H01v 7/00
[58] Field of Search ................................................ 310/8–9.4

[56] References Cited

UNITED STATES PATENTS

| | | |
|---|---|---|
| 2,714,672 | 8/1955 | Wright et al. ............................ 310/8.7 |
| 3,146,360 | 8/1964 | Marshall .................................. 310/8.7 |
| 3,349,259 | 10/1967 | Kistler .................................... 310/8.7 |
| 3,364,368 | 1/1968 | Sonderegger ............................ 310/8.7 |
| 3,390,287 | 6/1968 | Sonderegger ............................ 310/8.7 |
| 3,393,331 | 7/1968 | Puckett .................................. 310/8.7 X |
| 3,424,930 | 1/1969 | List et al. ................................ 310/8.7 |
| 3,461,327 | 8/1969 | Zeiringer ................................ 310/8.7 X |
| 3,482,122 | 12/1969 | Lenahan .................................. 310/9.1 |
| 3,497,728 | 2/1970 | Ostrofsky ................................ 310/9.1 X |

Primary Examiner—L. T. Hix
Assistant Examiner—Mark O. Budd
Attorney—Le Blanc & Shur

[57] ABSTRACT

Disclosed is a piezoelectric pressure transducer particularly suited for use with an engine gauge for measuring pressures in internal combustion engines or for sensing pressure in other severe temperature environments. A thin, flat diaphragm is protected by a ceramic shield and other elements of the gauge are made of material having a low thermal expansion such as invar. Access to the diaphragm is by way of a small annular, stepped groove to cool the gases acting on the diaphragm. A piezoelectric element such as quartz having two sensitive axes is employed and long term temperature effects are nullified by applying compensating stresses to the second axis of the piezoelectric element.

2 Claims, 16 Drawing Figures

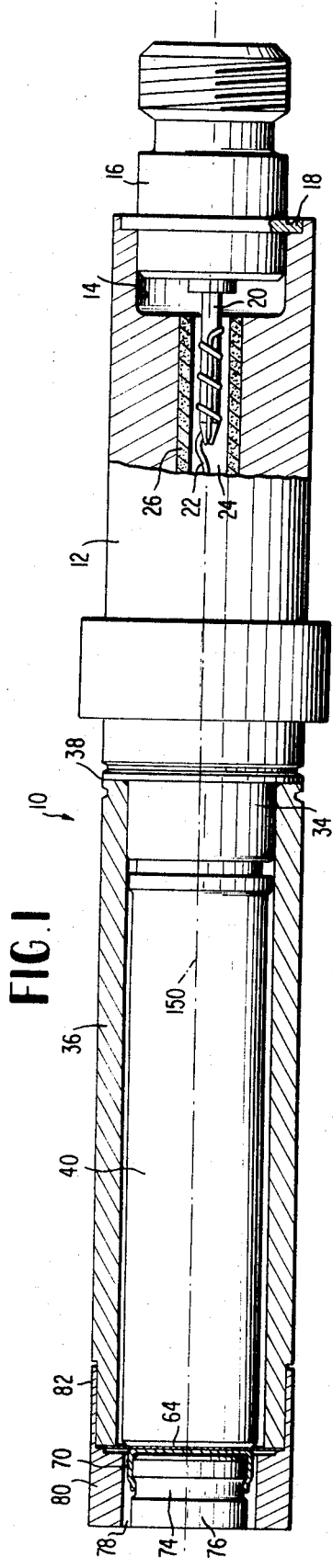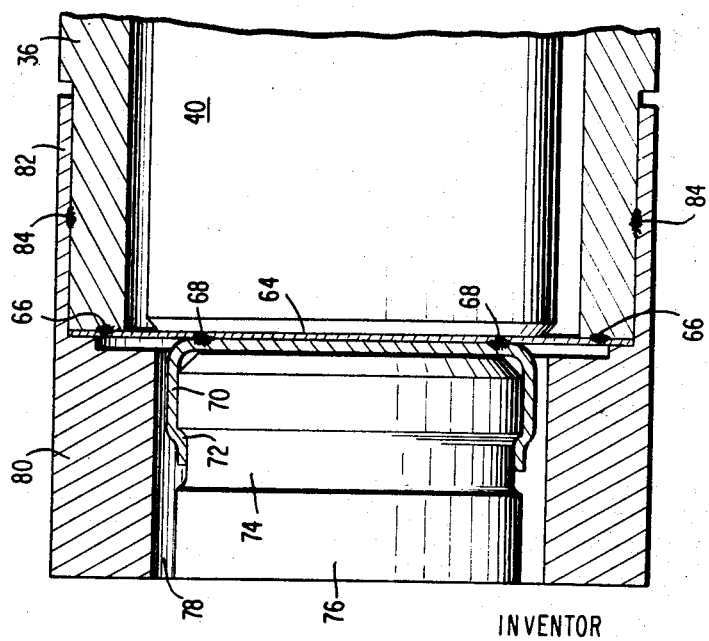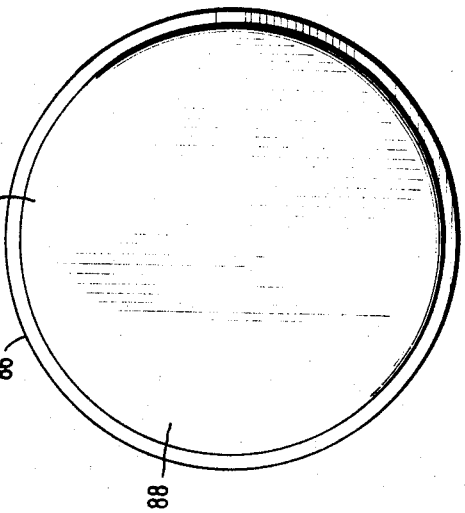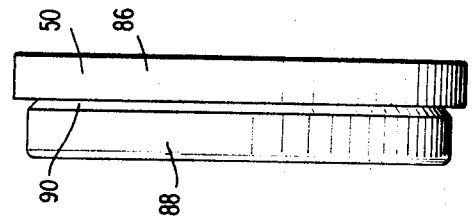
FIG. 1
FIG. 1A
FIG. 3
FIG. 4
INVENTOR
VERNON H. SIEGEL
BY Le Blanc & Shur
ATTORNEYS

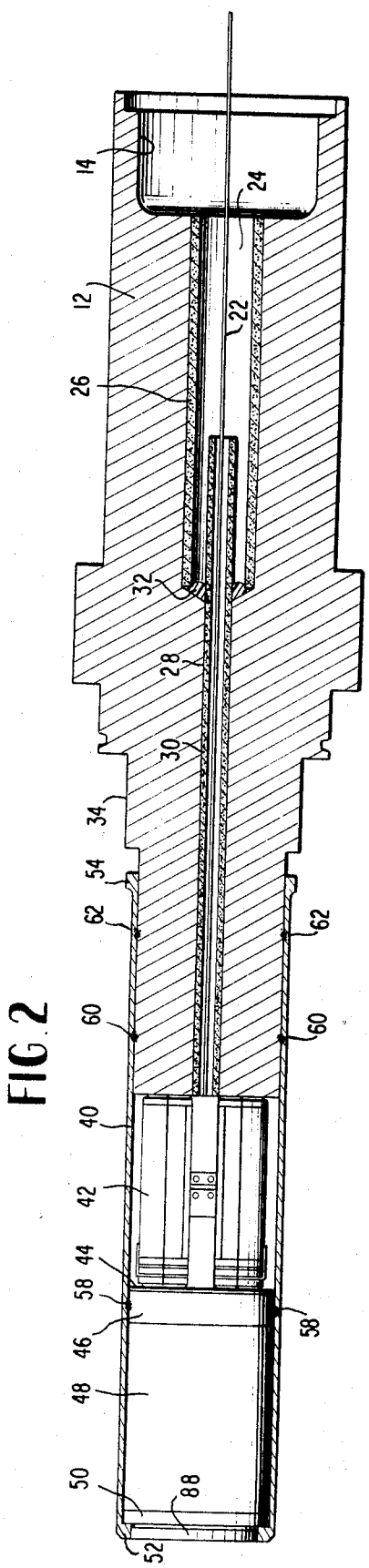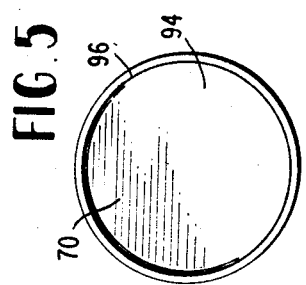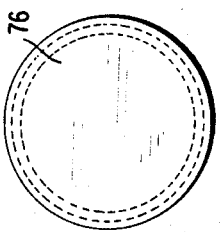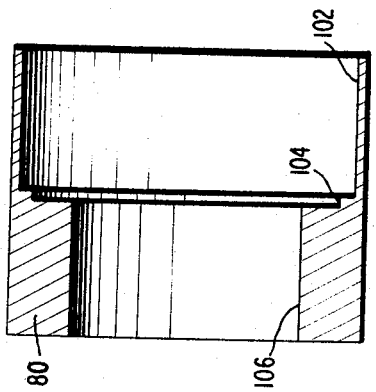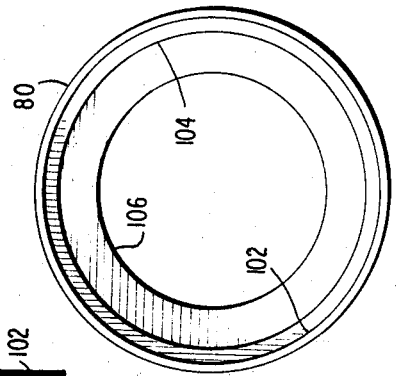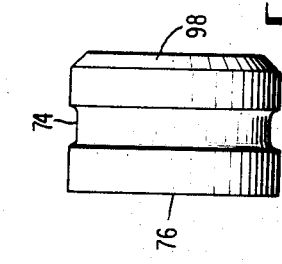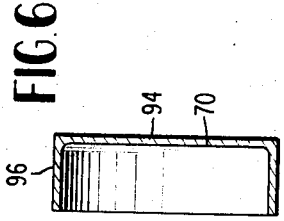

INVENTOR
VERNON H. SIEGEL

BY  *LeBlanc & Shur*

ATTORNEYS

PRESSURE TRANSDUCER WITH REDUCED TEMPERATURE SENSITIVITY

The present application is a continuation of my copending application Ser. No. 22,132, filed Apr. 1, 1970, for PRESSURE TRANSDUCER WITH REDUCED TEMPERATURE SENSITIVITY, which is in turn a continuation of my then copending application Ser. No. 703,621, filed Feb. 7, 1968, now abandoned.

This invention relates to piezoelectric pressure transducers and more particularly to a transducer suited for use in measuring pressure changes accompanied by extreme temperatures such as are encountered in cylinders of internal combustion engines and in explosion testing. The transducer is constructed to minimize transducer output due both to short duration high temperature flashes as well as long duration medium temperature variations.

In general, piezoelectric crystals produce a charge output in response to a stress generated as a result of a force applied to the crystal. Certain ferroelectric crystals such as barium titanate also produce a charge when the crystal is exposed to a change in temperature. Other crystals, such as quartz, do not exhibit an output due to temperature when the crystal is free, but when clamped between materials having a different coefficient of expansion, an output charge may result from quartz with any change in temperature. Also, in a practical transducer having a flat diaphragm, a charge output can be produced by flexing of the diaphragm due to a temperature gradient across the thickness of the diaphragm. Additional undesirable outputs may be generated in transducers as a result of expansion of a prestressing sleeve or other structures that are frequently used to clamp the piezoelectric crystals.

Because of these temperature effects, accurate measurement of dynamic cylinder pressure of an internal combustion engine is quite difficult, particularly measurement of the pressures during the scavenging and intake portions of the engine stroke where the pressure is of the order of 10 psi and occurs within a few milliseconds after a pressure of 1,000 psi or higher which higher pressure is accompanied by flash temperatures of 3,000° F. or more.

Transducers have been constructed where the sensing element is connected through a narrow passage to the cylinder chamber in order to minimize temperature effects. In general, these are unsatisfactory, since the resonance of the passage produces ripples in the pressure diagram. Additionally, if the sensing element does produce an output from temperature, the heat generated from the compression of the gases in the passage is generally sufficient to produce distortion of the pressure output.

These and other problems are overcome by the pressure transducer of the present invention, particularly suited for use with an engine pressure gauge. In particular, the present invention provides an arrangement for isolating the piezoelectric element of the transducer from temperatures so that short duration, high flash temperatures in the order of 3,000° F. or more have little or no effect on the output. Also incorporated in the unit are elements having different coefficients of expansion for long term temperature compensation especially suited for use with piezoelectric materials such as quartz and the like which have more than one electrically sensitive axis. The improved transducer of this invention has good high frequency response, is easier to work and manufacture and offers approximately a 10-fold increase in accuracy as compared to existing devices for measuring internal combustion engine pressures. It is capable of measuring pressures as high as 1,000 psi and higher and as low as ½ psi in extremely severe temperature environments.

In the transducer, a prestressed piezoelectric package is acted upon in response to pressures by a flat diaphragm. The diaphragm is to a large extent isolated from short term high temperature shocks by a ceramic block or heat shield having both a low coefficient of thermal expansion and a low thermal conductivity. Cooperating with the heat shield is a heat shroud which defines a relatively narrow and deep annular groove to further reduce the temperature of the pressure gases acting on the diaphragm. A novel heat shield retainer provides a stepped area at the inner end of the groove to further enhance the cooling effect of the gases. In this way, the outer end of the groove may be sufficiently large such that in conjunction with the ceramic material forming the heat shield, it assures rapid burn-off of any carbon deposits which might otherwise tend to collect and adversely interfere with the operation of the transducer.

In addition, long-term temperature compensation is provided in the device of this invention by matching the coefficient of thermal expansion of various elements of the device so as to exert an appropriate stress along a second active axis of the piezoelectric material which, by way of example, may be an X-cut quartz crystal having two mutually perpendicular electrical axes in addition to the third neutral or optical axis. Thus, long-term temperature effects which might otherwise produce an undesirable output due to stresses along the first axis are counteracted and nullified through the fact that this same long-term temperature build-up produces stresses on the crystals along the second axis to nullify the long-term effect.

It is therefore one object of the present invention to provide an improved temperature insensitive piezoelectric transducer.

Another object of the present invention is to provide a transducer particularly suited for measurements of pressure changes accompanied by extreme temperatures.

Another object of the present invention is to provide a pressure gauge particularly suited for use in measuring pressures encountered in internal combustion engines and in explosions.

Another object of the present invention is to provide a piezoelectric transducer having both short-term temperature immunity and long-term temperature compensation which is particularly useful in conjunction with gauges for measuring the pressures occurring in internal combustion engines, particularly the pressures occurring in the engine during the scavenging and intake portions of the stroke as well as the higher preceding engine pressures.

These and further objects and advantages of the invention will be more apparent upon reference to the following specification, claims and appended drawings wherein:

FIG. 1 is a vertical elevation with parts in section showing the novel pressure transducer of the present invention;

FIG. 1A is an enlarged view of the left-hand end of the transducer of FIG. 1;

FIG. 2 is a similar vertical view with parts in section showing the prestressed quartz subassembly forming part of the transducer of FIG. 1;

FIG. 3 is an end view of an end piece for the subassembly of FIG. 2;

FIG. 4 is a side view of the end piece of FIG. 3;

FIG. 5 is an end view of the heat shield retainer forming a part of the transducer of FIG. 1;

FIG. 6 is a sectional view of the heat shield retainer of FIG. 5;

FIG. 7 is an end view of the ceramic heat shield incorporated in the transducer of FIG. 1;

FIG. 8 is a side view of the heat shield of FIG. 7;

FIG. 9 is an end view of the heat shroud completing the transducer of FIG. 1;

FIG. 10 is a sectional view of the heat shroud of FIG. 9;

Figure 11:
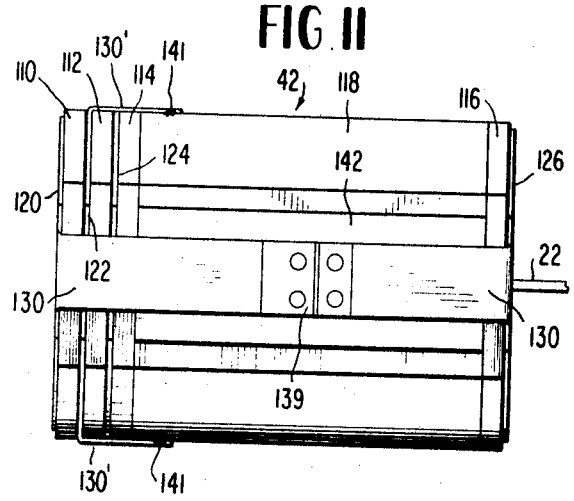
FIG. 11 is an elevational view of an acceleration compensated quartz crystal package usable in the pressure transducer of FIG. 1.

Referring to the drawings and particularly to FIGS. 1 and 2, the novel piezoelectric pressure transducer of the present invention is generally illustrated at 10 in FIG. 1. The transducer comprises a conductive metallic base 12 provided with a cavity 14 at its rear end frictionally receiving a coaxial connector 16. Connector 16 is preferably provided with an outer flange 18 arc welded to the rear end of the base 12. Connector 16 is provided with a stud 20 at its forward end. The stud is crimped to one end of a lead wire 22 constituting the active output lead from the transducer. The other side of the transducer output is by way of the grounded base 12 and this base is provided with a central aperture 24 into which stud 20 projects and which aperture also receives a hollow circular insulator 26 electrically isolating the two sides of the transducer output.

Enlarged aperture 24 centrally located in base 12 communicates with a smaller aperture 28 which receives a second hollow cylindrical insulator 30 surrounding output lead 22. Insulators 26 and 30 are preferably made of dense alumina (98 percent $Al_2O_3$), having a volume resistivity at 300° C. of $10^{13}$ Ohms. Both insulators are joined to each other and to the base 12 by an insulating adhesive such as epoxy as illustrated at 32 in FIG. 2.

Joined to the base 12 over the reduced diameter shoulder 34 is a metallic case 36 preferably made of invar having a thermal coefficient of expansion of less than 1 part per million per degree centigrade. Case 36 is preferably joined to base 12 by arc welding at the joint 38 in FIG. 1. Also joined to the base and surrounded by casing 36 is a prestressing sleeve 40 preferably also made of invar and enclosing a quartz wafer package generally indicated at 42 which is sandwiched between the outer end of base 12 and a flat solid cylindrical temperature compensating plate 44. Completing the subassembly of FIG. 2 is a flat solid cylindrical buffer plate 46, a ceramic piece or body 48 also of solid cylindrical configuration, and an end piece 50. Prestressing sleeve 40 is open at both ends but includes an inwardly turned annular flange 52 overlying end piece 50 at its one end and an outwardly turned or thickened annular flange 54 at its other end. Sleeve 40 may be stretched by applying a suitable tool to thickened or flanged end 54 to prestress the quartz crystal wafer package 42 by squeezing it between compensating plate 44 and the outer end of base 12. Sleeve 40 is preferably spot welded by a plurality of circumferentially spaced spot welds to buffer plate 46 as illustrated at 58 and to the base 12 at two locations as indicated by the annularly spaced series of spot welds referenced at 60 and 62. Each set of annularly spaced spot welds 56, 58, 60, and 62 are preferably 12 in number and are spaced at equal angles about the circumference of prestressing sleeve 40. These welds are preferably formed in an alternating sequence to minimize stresses in the manner shown in FIG. 3 of U.S. Pat. No. 3,351,787, issued Nov. 7, 1967.

Spot welded to the end of case 36 is a completely flat circular metal diaphragm 64. Diaphragm 64 is preferably welded to the end of the case with a continuous weld 66 on a 0.212 inch diameter. In the preferred embodiment, the diaphragm has an overall diameter of 0.234 inches and is formed of annealed invar having a thickness of 0.003 inch. In turn, spot welded to the diaphragm, as at 68, is a heat shield retainer 70 of generally cup-shaped configuration having its outer edge rolled over as at 72 into a groove 74 in a ceramic heat shield 76. Surrounding ceramic heat shield 76 and spaced from it by annular groove 78 is a heat shroud 80 having a rearwardly extending annular flange 82 spot welded as at 84 to the annealed invar case 36. Spot welds 84 are preferably 12 in number and equally spaced around the diameter. On the other hand, the heat shield retainer 70 is preferably spot welded to the diaphragm 64 by a total of 16 welds spaced at equal angles at a 0.125 inch diameter.

FIGS. 3 and 4 are enlarged views of the end piece 50 of FIG. 2. This end piece has an enlarged end 86 which, as shown in FIG. 2, engages sleeve 40 and a smaller end 88 which projects through the corresponding aperture in the sleeve to be surrounded by the enlarged and inwardly turned flange 52 of the sleeve. These two ends of the end piece 50 are separated by a small groove 90. The end piece is preferably made of annealed invar and has an overall diameter of 0.158 inch and an overall thickness of 0.030 inch.

FIGS. 5 and 6 show to an enlarged scale, the heat shield retainer 70 of FIG. 1. This retainer is likewise preferably made of annealed invar and comprises a base 94 which is illustrated in FIG. 1 as spot welded to the diaphragm 64 and an annular flange 96 which is initially straight but is rolled by a suitable tool into the groove 74 of the heat shield as also illustrated in FIG. 1. The heat shield retainer 70 has an overall diameter of 0.155 inch in the embodiment described and a length from the base to the outer edge of the annular flange 96 of 0.056 inch.

FIGS. 7 and 8 are enlarged views of the heat shield 76 of FIG. 1. The heat shield is provided with the previously described groove 74 and a chamfered inner edge 98 chamfered at a 45° angle. The heat shield is preferably formed of a ceramic identified as cordierite mix No. DC65E118, manufactured by the Du-Co Ceramics Company. It has an overall diameter of 0.1460 inch and an overall length of 0.092 inch. The diameter of the heat shield at the base of groove 74 is 0.136 inch.

FIGS. 9 and 10 are enlarged views of the heat shroud 80 of FIG. 1. The heat shroud is preferably formed of annealed invar with an enlarged aperture 102 in one end stepped to a smaller diameter at 104 and communicating with a smaller aperture 106 at its other end. The diameter of the aperture 106 is 0.163 inch, the diameter at 104 is 0.215 inch and the diameter at 102 is 0.238 inch. The overall diameter of the heat shroud is 0.249 inch and the total length is 0.200 inch. The length of aperture 102 is 0.100 inch and the length of step 104 is 0.005 inch.

Figure 12:
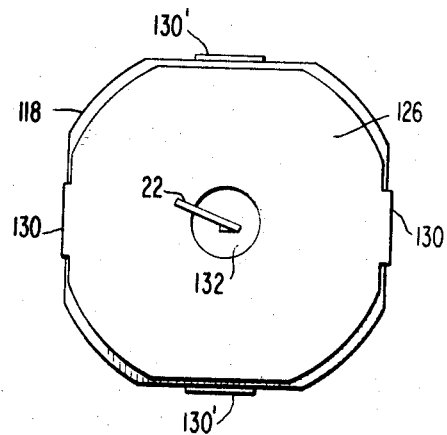
FIG. 12 is an end view of the quartz package shown in FIG. 11.
Figure 13:
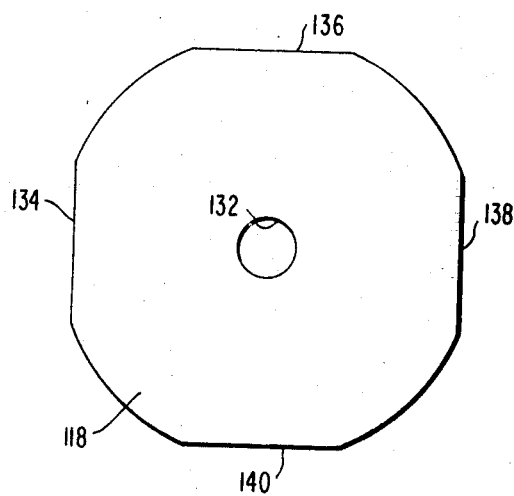
FIG. 13 is an end view of the seismic mass forming a part of the crystal package of FIGS. 11 and 12.
Figure 14:
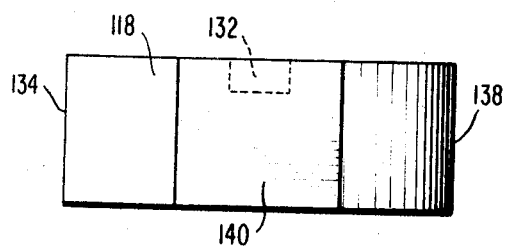
FIG. 14 is a side view of the seismic mass of FIG. 13.

FIGS. 11 and 12 are enlarged views of the quartz crystal wafer package 42 of FIG. 2. This package is in many respects similar to that disclosed in U.S. Pat. No. 3,349,259 and reference may be had to that patent for a more detailed description of its function and operation. Briefly, the package comprises a plurality of quartz crystal wafers, i.e., such as the four crystal wafers 110, 112, 114, and 116 and a seismic mass 118 illustrated in more detail in FIGS. 13 and 14.

Figure 15:
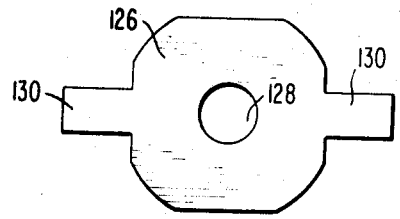
FIG. 15 is an end view of one of the gold electrodes incorporated in the quartz crystal package of FIGS. 11 and 12.

Overlying some and spaced between others of the quartz crystals, are conductive electrodes 120, 122, 124, and 126, one of which is shown in more detail in FIG. 15. The electrodes are preferably formed of gold having a 99.9 percent purity condition annealed and each include a central aperture 128 and a pair of outwardly extending rectangular tabs 130, which in the assembly of FIG. 11 are bent over and run along the side of the package to form electrical connections. The seismic mass is provided with a counter bore 132 and is generally of cylindrical configuration but with four flattened edges 134, 136, 138, and 140. Seismic mass 118 is preferably formed of heavy metal tungsten and has an overall outer diameter of 0.148 inches with the distance between opposite flat surfaces being 0.136 inch. Active lead 22 passes through the aperture 128 in electrode 126 and through a corresponding aperture in quartz wafer 116 and is welded into the counterbore 132 of the seismic mass 118. The tabs 130 of electrodes 120, 124, and 126 are joined together as at 139 in FIG. 11 as by welding so that when assembled, both are in electrical contact with the conductive base 12 as illustrated in FIG. 2. The corresponding tabs 130 of electrode 122 are spaced 90° and welded to the seismic mass 118 as at 141. The joined tabs 130 of the electrodes 120, 124, and 126 are spaced from the seismic mass 118 by a flat rectangular sheet of insulation 142.

As more fully described in the aforementioned U.S. Pat. No. 3,349,259, the elements of the crystal package 42 are chosen so as to provide acceleration compensation and in this respect, the signal output of quartz wafer 116 is opposite to and nullifies the output of one of the other three wafers 110, 112, and 114. To this end, the wafers are positioned so that they develop charge at their opposite surfaces with the polarity indicated in the drawing. The output signal is equivalent to the output of two of the wafers since the output of a third wafer is cancelled by the fourth. However, because of the intervening seismic mass 118, acting only on the quartz wafer 116, this wafer completely cancels any undesirable signals from all of the other three wafers resulting from acceleration forces. The output signal is taken from the electrically conductive seismic mass 118 by way of output lead 22 with the other side of the output (preferably grounded) derived from electrode 126 by way of the conductive base 12 of FIG. 1.

Referring again to FIGS. 1 and 2, the function of the various elements will now be described. Although an acceleration compensated piezoelectric wafer package has been illustrated and described in the specific embodiment, the present invention is directed primarily to the elimination of temperature effects and other types of piezoelectric crystal assemblies may be employed.

Referring specifically to FIG. 2, temperature compensation plate 44 is provided for long-term temperature compensation for a reason more fully described below. Buffer plate 46 is a rigid plate to permit welding of the preload sleeve 40 around its periphery and the coefficient of expansion of buffer plate 46 is important for long-term temperature compensation as also described below. Cylindrical ceramic piece 48 is a low expansion, low mass, low conductivity ceramic material used to help isolate the sensing element of the transducer from heat. End piece 50 is provided to cooperate with the prestressed sleeve 40 used to provide a prestress load or squeezing force on the piezoelectric crystals, which sleeve clamps and preloads the individual components to the base 12.

In ordinary practice, the combined change in length with temperature of the quartz package, temperature compensation plate, buffer plate, ceramic piece, and end piece just described, would be adjusted to equal the change in length of the preload sleeve 40 so that with a change in temperature, the net change in charge output of the piezoelectric package would be zero. However, this conventional arrangement has the significant disadvantage that for a rapid change in temperature applied to the end piece 50 or to the preload sleeve 40, an output results since the preload sleeve expands, thereby changing the force applied to the quartz crystals, before the expansion of the other elements which are more centrally located can offset the change.

In accordance with the present invention, the change in length is not matched in the customary manner. The preload sleeve 40 and the end piece 50 are instead fabricated from invar to provide a minimum of expansion in response to a rapid temperature variation and ceramic piece 48 is made from cordierite which has a low thermal expansion and also a low thermal conductivity. In this manner, the sensing element of the present invention produces a minimum output from a rapid change in temperature but without the additional long-term compensation provided below, would otherwise have a significant output as the temperature change persists.

To avoid long-term temperature changes, a piezoelectric crystal having two mutually perpendicular sensitive axes is employed such as an X-cut quartz crystal. One of the axes referred to as the X-axis, coincides with the longitudinal axis 150 of the transducer whereas the other electrically active axis referred to as the Y-axis is perpendicular to the longitudinal axis 150 of the transducer. Because of the two active axes, any compression along the Y-axis will produce a charge output signal equal to but of opposite polarity to the charge generated by compression along the X-axis.

Conventional practice for minimum charge output from changes in temperature is to provide a material in contact with the quartz surface chosen to have a coefficient of expansion very near to that of the coefficient along the Y-axis of the quartz. However, as previously described in the present invention, the materials of the preload sleeve and other elements are specifically chosen to provide minimum expansion rather than matched expansion, resulting in some output from stresses along the X-axis due to long duration temperature change. This is counteracted in the present invention by exerting a suitable counteracting compression or tension on the transverse Y-axis. Obviously, if a number of suitable materials having different coefficients of expansion are available, one can be chosen for the transverse expansion plate or temperature compensating plate 44. However, in actual practice, each individual transducer responds somewhat differently, making the selection of materials difficult and time consuming. A solution to the problem is to, in effect, provide the compensation plate 44 with a variable range of temperature coefficients of expansion. This is done by providing the buffer plate 46 from one material having a lower expansion coefficient than that of the piezoelectric crystal and selecting the compensating plate 44 from a material having a higher coefficient (or vice versa). Then, by varying the thickness of plate 44, the effective coefficient of expansion of the surface in contact with the piezoelectric crystals may be made to vary both greater or less than that of the crystal thereby providing either tension or compression to the crystal package which provides either positive or negative output for long-term changes in temperature.

In the specific embodiment disclosed, the material of buffer plate 46 has a thermal expansion coefficient of $10 \times 10^{-6}$ per degree centigrade while the material of compensating plate 44 has a coefficient of $18 \times 10^{-6}$ per degree centigrade as contrasted with the Y-axis of quartz having a coefficient of $14.3 \times 10^{-6}$ per degree centigrade The material of the casing 36 of FIG. 1 is also chosen to be invar so that changes in temperature will produce a minimum change in length and hence a minimum change in force applied through the diaphragm.

Thus, it can be seen that the transducer of the present invention is designed in all respects to minimize variations in output due to short term temperature changes by eliminating or minimizing stresses caused by short-term temperature variations. However, as a result, some long-term stresses along the X-axis may occur but any resulting long-term temperature variations are separately taken care of or compensated for by the stresses imparted to the transverse or Y-axis of the quartz crystals by the materials of the elements adjacent thereto. To further reduce short-term temperature variations, a substantially thin, flat diaphragm 64 is employed. That is, if a flash of temperature is applied to a flat sheet, then the surface nearest the flash will tend to expand. The surface away from the flash will not instantaneously change temperature and will not expand. The result is that the sheet will tend to bend away from the heat until both surfaces reach the same temperature. With an ordinary diaphragm, this warping results in a force applied to the piezoelectric column and hence an output due to temperature. This force is minimized in the present invention by making the diaphragm very thin and from a low thermal expansion material such as invar to decrease the temperature difference stresses on opposite sides.

Although the diaphragm 64 is fabricated from invar, when very high temperatures are applied, the coefficient of expansion of invar increases from $0.5 \times 10^{-6}$ to $10 \times 10^{-6}$ per degree centigrade. Under these conditions, appreciable forces may be generated by the diaphragm and protection is required. For internal combustion engines, a second problem is also encountered, i.e., the deposit of carbon. The solutions to these problems afforded by the device of the present invention is the provision of a shield for the diaphragm to shield it from direct conduction and this is provided by the low conductivity, low expansion, ceramic piece or heat shield 76. Since some pressure must be applied to the diaphragm, the shield does not completely block it from the pressure gases but rather is spaced by an annular gap from heat shroud 80. With this spacing, the pressure media in contact with the diaphragm is cooled since the annular gap is made sufficiently small to contain a small volume. Theoretically, the annular gap should be tapered with as small a volume at the bottom as possible so that hot gases are not compressed into the gap as far as they would be if a large volume was present at the bottom of the annular groove. The width of the groove should be small compared to the depth of the groove to provide maximum cooling. If desired, the outer walls of the groove can be cooled for best heat results. However, if the width of the groove is made too small, i.e., a few thousandths of an inch, then during use in an internal combustion engine, carbon may build up and bridge the gap resulting in a change of sensitivity, linearity and hysteresis of the transducer. To discourage build-up of carbon, the heat shield 76 is made from a low heat conductivity ceramic. The outer surface of the shield may reach red hot or white hot, thereby burning away carbon deposits while maintaining minimum heat transfer to the diaphragm. The heat shield material also has low thermal expansion thereby minimizing susceptibility to cracking when exposed to thermal shocks.

The groove illustrated in FIG. 1 is not tapered but is in effect stepped due to the diameter of heat shield retainer 70 and this stepped configuration is a suitable approximation to a tapered groove. With the heat protection arrangement shown, a reduction in output from a transient temperature of 750:1 has been achieved over an unprotected diaphragm of similar construction.

It is apparent from the above that the present invention provides an improved piezoelectric transducer highly insensitive to temperature changes and one particularly suited for use with an engine gauge for measuring pressures in internal combustion engines. The transducer provides short-term temperature immunity and long-term temperature compensation so that it is able to measure pressures quite accurately even during the scavenging and intake portions of the stroke as well as the pressures immediately preceding the scavenging and intake portions. Thus, the transducer of the present invention is able to measure pressures quite accurately on the order of 10 psi even when as with internal combustion engines, these pressures occur within a few milliseconds after pressures also accurately sensed by the transducer of 1,000 psi or higher which high pressures are accompanied with flash temperatures of 3,000° F. or more. The device of the present invention provides a 10-fold increase in accuracy over known transducers usable for measuring pressures in internal combustion engines.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pressure transducer comprising a piezoelectric sensing element, a pressure diaphragm mechanically coupled to said sensing element for stressing said piezoelectric element in response to fluid pressure acting on said diaphragm, a heat shield mounted on said diaphragm on the side remote from said sensing element for protecting said diaphragm from heat, said heat shield having a low coefficient of thermal expansion and a low thermal conductivity, a heat shroud surrounding but spaced from said heat shield, said shroud and heat shield defining an annular groove communicating with said diaphragm, said groove being stepped to a smaller dimension at its end adjacent said diaphragm, said sensing element having first and second mutually perpendicular electrically sensitive axes, said pressure diaphragm being mechanically coupled to stress said element along said first axis, and temperature compensating means mechanically coupled to said element for applying compensating stresses to said element along said second axis in response to variations in temperature, said temperature compensating means comprising a pair of side-by-side masses positioned along said first axis, one of said masses engaging one side of said element, the temperature coefficient of thermal expansion of one of said masses being higher and the other lower than the coefficient of thermal expansion of said element along said second axis.

2. A pressure transducer comprising a piezoelectric sensing element, a pressure diaphragm mechanically coupled to said sensing element for stressing said piezoelectric element in response to fluid pressure acting on said diaphragm, a heat shield mounted on said diaphragm on the side remote from said sensing element for protecting said diaphragm from heat, said heat shield having a low coefficient of thermal expansion and a low thermal conductivity, a heat shroud surrounding but spaced from said heat shield, said shroud and heat shield defining an annular groove communicating with said diaphragm, said sensing element having first and second electrically sensitive axes, said pressure diaphragm being mechanically coupled to stress said element along said first axis, and temperature compensating means mechanically coupled to said element for applying compensating stresses to said element along said second axis in response to variations in temperature, said groove being stepped to a smaller dimension at its end adjacent said diaphragm.

* * * * *